(12) United States Patent
Harvey et al.

(10) Patent No.: US 11,084,739 B2
(45) Date of Patent: Aug. 10, 2021

(54) STACK OF ELECTROCHEMICAL CELLS FOR WASTEWATER TREATMENT WITH ISOLATED ELECTRODES

(71) Applicant: AXINE WATER TECHNOLOGIES INC., Vancouver (CA)

(72) Inventors: David Harvey, Maple Ridge (CA); Brendan Wood, Vancouver (CA); Barathram Jayasankar, Burnaby (CA); Alexander Bellemare-Davis, Vancouver (CA)

(73) Assignee: Axine Water Technologies Inc., Vancouver (CA)

( * ) Notice: Subject to any disclaimer, the term of this patent is extended or adjusted under 35 U.S.C. 154(b) by 153 days.

(21) Appl. No.: 16/489,637

(22) PCT Filed: Feb. 28, 2018

(86) PCT No.: PCT/US2018/020269
§ 371 (c)(1),
(2) Date: Aug. 28, 2019

(87) PCT Pub. No.: WO2018/160727
PCT Pub. Date: Sep. 7, 2018

(65) Prior Publication Data
US 2020/0010341 A1 Jan. 9, 2020

Related U.S. Application Data

(60) Provisional application No. 62/465,448, filed on Mar. 1, 2017.

(51) Int. Cl.
*C02F 1/46* (2006.01)
*C02F 1/461* (2006.01)
(Continued)

(52) U.S. Cl.
CPC ........ *C02F 1/46109* (2013.01); *C02F 1/4672* (2013.01); *C02F 2001/46142* (2013.01); *C02F 2101/16* (2013.01); *C02F 2201/46115* (2013.01)

(58) Field of Classification Search
CPC ................ C02F 1/46109; C02F 1/4672; C02F 2001/46142; C02F 2101/16;
(Continued)

(56) References Cited

U.S. PATENT DOCUMENTS 6,428,921 B1 8/2002 Grot
10,696,570 B2 * 6/2020 Harvey .................... C25B 11/02
(Continued)

*Primary Examiner* — Arun S Phasge
(74) *Attorney, Agent, or Firm* — Seed IP Law Group LLP

(57) ABSTRACT

A stack of electrochemical cells for wastewater treatment is disclosed comprising at least one electrochemical cell having a solid polymer membrane, an anode catalyst layer and a cathode catalyst layer adjacent to each side of the membrane, an open pore mesh placed next to each of the catalyst layers and a compression frame placed next to each open pore mesh. A cover is placed between the compression frames of two neighbouring electrochemical cells in the stack thereby forming an enclosure which spans the distance between the two neighbouring electrochemical cells thereby isolating the cathode catalyst layer or the anode catalyst layer from the solution in the reactor tank in which the stack is immersed.

21 Claims, 9 Drawing Sheets

(51) Int. Cl.
*C02F 1/467* (2006.01)
*C02F 101/16* (2006.01)

(58) Field of Classification Search
CPC .... C02F 2201/46115; C02F 2201/4617; C02F 2201/4618; C02F 1/461
See application file for complete search history.

(56) References Cited

U.S. PATENT DOCUMENTS

| | | |
|---|---|---|
| 2002/0068212 A1 | 6/2002 | Osenar et al. |
| 2002/0086199 A1 | 7/2002 | Gibb et al. |
| 2012/0117789 A1 | 5/2012 | Liang et al. |
| 2015/0298998 A1 | 10/2015 | Legzdins |

* cited by examiner

STACK OF ELECTROCHEMICAL CELLS FOR WASTEWATER TREATMENT WITH ISOLATED ELECTRODES

TECHNICAL FIELD

The present invention relates to a stack of electrochemical cells for wastewater treatment, and in particular it relates to a stack of electrochemical cells for the removal of organic and inorganic pollutants comprising at least one electrochemical cell immersed in a reactor tank, with one electrode of the electrochemical cell being protected by a cover which isolates it from the wastewater or from any other solution in the reactor tank.

BACKGROUND

There is substantial growth in the demand for new wastewater treatment solutions, especially for water treatment systems that are cost-effective, sustainable, do not produce secondary pollution, are compliant with water quality standards and have minimal operational and maintenance requirements. The preferred approach to treat wastewater is by non-chemical oxidation techniques, for example through electrochemical oxidation. Electrochemical oxidation is efficient in eliminating a wide range of pollutants such as persistent organic pollutants, dioxins, nitrogen species (e.g. ammonia), pharmaceuticals, pathogens, microorganisms and a majority of priority pollutants and pesticides.

A variety of cell configurations that include flow-through parallel plates, divided chambers, packed bed electrodes, stacked discs, concentric cylinders, moving bed electrodes and filter-press have been developed for direct and indirect electrochemical oxidation of wastewater treatment.

One configuration of an electrolytic cell for wastewater treatment uses a solid polymer electrolyte (SPE) as described, for example, in applicant's patent publication WO2012167375. The system comprises an electrolytic cell comprising a cathode with a cathode gas diffusion layer and a cathode catalyst layer, an anode with an anode diffusion layer and an anode catalyst layer and a solid polymer membrane electrolyte separating the anode and cathode layers. Wastewater is delivered uniformly to and from anode fluid delivery layer by directing it through the flow field channels provided in an anode flow field plate placed next to the anode fluid delivery layer. The hydrogen gas generated during the electrochemical treatment of wastewater is collected from the cathode and directed out of the electrolytic cell by way of the flow field channels provided in the flow field plate placed next to the cathode fluid delivery layer. The system can comprise multiple electrolytic cells in stacks and in either series and/or parallel arrangements and can operate without catholyte or other supporting electrolyte.

The applicant has further developed a system, as disclosed in applicant's patent application WO2017123969 where a stack of electrochemical cells are immersed in a reactor tank which contains the wastewater to be treated, wherein each electrochemical cell comprises a solid polymer electrolyte (SPE) membrane and anode and cathode catalyst layers, each catalyst layer adjacent to one side of the solid polymer electrolyte membrane, and open pore meshes, each open pore mesh being adjacent to a catalyst layer. The system further comprises compression frames, each frame adjacent to an open pore mesh and having compression arms spread within the area delimited by its perimeter, the compression arms being connected to each other at connection sites. The system further comprises fasteners which protrude through the holes provided in the arms of the compression frames at connection sites, through the holes provided in the open pore meshes and through the catalyst coated membrane to compress the solid polymer electrolyte membrane, the catalyst layers and the open pore meshes between the two compression frames. This system has proven to achieve a higher rate of pollutant removal with a lower operating cost due to the removal of the flow field plates and of the random, heterogeneous porous media (gas diffusion layers). The system provides low voltage operation and energy consumption and can operate at variable effluent flow rates.

In systems where the stack of electrochemical cells is immersed in the reactor tank having both the cathode and anode catalyst layers exposed to the wastewater to be treated, such as the one described in the applicant's co-pending patent application, intermediary reagents formed during the oxidation of wastewater at the anode can poison the cathode catalyst. Furthermore the wastewater which is oxidized on the anode side and is substantially clean of the primary contaminants, but might potentially contain intermediate reagents of the oxidation process, can come into contact with the cathode catalyst and the intermediate reagents can be reduced, thereby reversing the cleaning oxidation process which takes place on the anode side. Furthermore, in some cases, for example in the case of the treatment of wastewater which comprises ammonia, sodium chloride (NaCl) is added to the reactor tank to induce the formation of in-situ hypochlorite and to complete the indirect oxidation of polluted water. In these cases, some of the sodium chloride might remain in the treated water within the reactor tank and can be discarded from the tank through the outlet piping that transports the treated water to the treated water collection tank. Sodium chloride possesses a high conductivity and could therefore in some cases pose a risk of corroding piping downstream from the treatment system.

Therefore, the performance of the system where the stack of electrochemical cells is immersed in the reactor tank can be further improved by isolating either the anode or the cathode from the bulk solution in the reactor tank. The present invention addresses this need providing several benefits as disclosed herein.

SUMMARY OF THE INVENTION

The present invention describes a stack of electrochemical cells for wastewater treatment comprising at least one electrochemical cell, the electrochemical cell comprising a solid polymer electrolyte membrane, an anode catalyst layer adjacent to a first side of the solid polymer electrolyte membrane and a cathode catalyst layer adjacent to a second side of the solid polymer electrolyte membrane, opposite to the first side. The electrochemical cell further comprises a first open pore mesh adjacent to the anode catalyst layer and a second open pore mesh adjacent to the cathode catalyst layer, a first compression frame, adjacent to the first open pore mesh which is adjacent to the anode catalyst layer and a second compression frame, adjacent to the second open pore mesh which is adjacent to the cathode catalyst layer, each of the compression frames having compression arms spread within the area delimited by the perimeter of the frame, the compression arms being connected to each other at connection sites. Fasteners protrude through holes provided in the compression arms of the first and second compression frames at the connection sites, through holes provided in the first and second open pore meshes and through the solid polymer electrolyte membrane and the anode and cathode catalyst layers. The fasteners together with the compression frames provide the force to compress the solid polymer electrolyte membrane, the catalyst layers and the open pore meshes between the two compression frames. A cover is attached to the first compression frame placed on the anode catalyst layer side of the cell or to the second compression frame placed on the cathode catalyst layer side of the cell to form an enclosure for protecting the anode or the cathode catalyst layer by isolating them from the solution in the reactor tank when the stack is immersed therein.

In this first embodiment of the present invention, the cover has one side provided with an opening for allowing access of wastewater, an anode solution or a cathode solution to the anode or respectively the cathode catalyst layer of the electrochemical cell in the stack. The cover further comprises an inlet pipe for feeding wastewater, an anode solution or a cathode solution into the enclosure formed by the cover, an outlet pipe for removing reaction products that are formed at the anode catalyst or at the cathode catalyst from the enclosure formed by the cover and a vent pipe for removing gases from the enclosure formed by the cover.

The stack further comprises a seal between the side of the cover provided with an opening and the compression frame next to that side.

The cover is made of a non-conductive material.

The stack comprises a plurality of electrochemical cells connected through at least one rod which holds an electrochemical cell in the stack at a distance from a neighbouring electrochemical cell.

In another embodiment of the present invention, the stack of electrochemical cells comprises at least one repeating unit comprising two electrochemical cells, each electrochemical cell comprising a solid polymer electrolyte membrane, an anode catalyst layer adjacent to a first side of the solid polymer electrolyte membrane and a cathode catalyst layer adjacent to a second side of the solid polymer electrolyte membrane, opposite to the first side. Each electrochemical cell further comprises a first open pore mesh adjacent to the anode catalyst layer and a second open pore mesh adjacent to the cathode catalyst layer, a first compression frame, adjacent to the first open pore mesh and a second compression frame, adjacent to the second open pore mesh, each of the compression frames having compression arms spread within the area delimited by the perimeter of the frame, the compression arms being connected to each other at connection sites. Fasteners protrude through holes provided in the compression arms of the first and second compression frames at the connection sites, through holes provided in the first and second open pore meshes and through the solid polymer electrolyte membrane and the anode and cathode catalyst layers and provide, together with the compression frames the force necessary for compressing the components of the electrochemical cell. The stack further comprises at least one rod for connecting the electrochemical cells in the stack and holding the first electrochemical cell in the repeating unit at a distance from the second electrochemical cell in the repeating unit, such that the anode side of the first electrochemical cell is facing the anode side of the second electrochemical cell or such that the cathode side of the first electrochemical cell is facing the cathode side of the second electrochemical cell.

In this embodiment, a cover is placed between the compression frames of the two neighbouring electrochemical cells of the repeating unit, and forms an enclosure spanning the distance between the two neighbouring cells to thereby isolate the anode catalyst layers or the cathode catalyst layers of the two neighbouring electrochemical cells of the repeating unit from the solution in the reactor tank.

In one embodiment, the electrochemical cells in a repeating unit of the stack are positioned such that the compression frame which is adjacent to the open mesh next to the cathode catalyst layer of the first electrochemical cell of the repeating unit is facing the compression frame adjacent to the open mesh next to the cathode catalyst layer of the second electrochemical cell of the repeating unit which is neighbouring the first electrochemical cell of the repeating unit in the stack.

In this embodiment, a cover is placed between the compression frames of the neighbouring electrochemical cells of the repeating unit and the cover has an inlet pipe for feeding a cathode solution into the enclosure formed by the cover, an outlet pipe for removing reaction products that are formed at the cathode catalyst from the enclosure formed by the cover, a vent pipe for removing gases from the enclosure formed by the cover, a first side and a second side, opposite to each other, each side being provided with an opening to allow access of the cathode solution to the cathode catalyst layers of the two neighbouring cells.

In another embodiment, the electrochemical cells in the stack are positioned such that the compression frame which is adjacent to the open mesh next to the anode catalyst layer of a first electrochemical cell of a repeating unit is facing the compression frame which is adjacent to the open mesh next to the anode catalyst layer of a second electrochemical cell of the repeating unit, which is neighbouring the first electrochemical cell of the repeating unit in the stack.

In this embodiment, a cover is placed between the compression frames of the first and second electrochemical cells in the repeating unit, next to the anode catalyst and the cover has an inlet pipe for feeding wastewater or an anode solution into the enclosure formed by the cover, an outlet pipe for removing reaction products that are formed at the anode catalyst layer from the enclosure formed by the cover and a vent pipe for removing gases from the enclosure formed by the cover, a first side and a second side, opposite to each other, each side being provided with an opening to allow access of the wastewater or the anode solution to the anode catalyst layers of the two neighbouring cells in the repeating unit.

In the embodiments where the cover is provided with two opposite sides, each side having an opening, a seal is placed between each side of the cover and the compression frame next to that side.

In all the presented embodiments, the solid polymer electrolyte membrane can be an anion solid polymer electrolyte or a cation solid polymer electrolyte and the cover is made of a non-conductive material.

The present invention also refers to a system for the treatment of wastewater comprising at least one stack of electrochemical cells described here, the stacks being immersed in a reactor tank which contains wastewater or a cathode solution. The stacks can be connected in series or in parallel.

A method for wastewater treatment is also described, the method comprising the steps of:
a. providing at least one stack of electrochemical cells, comprising a cover attached to the compression frame of at least one electrochemical cell in the stack on the anode side, the cover having one side with an opening facing the anode catalyst layer side of the electrochemical cell, the stack being immersed in a reactor tank which contains the wastewater to be treated,
b. supplying an anode solution to the enclosure formed by the cover and the compression frame, c. providing a voltage across the electrochemical cells, and
d. operating the electrochemical cells at a current density to thereby degrade the pollutant in the wastewater.

A method for wastewater treatment is also described, the method comprising the steps of:
a. providing at least one stack of electrochemical cells, comprising a cover attached to the compression frame of at least one electrochemical cell in the stack on the anode side, the cover having one side with an opening facing the anode catalyst layer side of the electrochemical cell, the stack being immersed in a reactor tank which contains cathode solution,
b. supplying wastewater to be treated to the enclosure formed by the cover and the compression frame,
c. providing a voltage across the electrochemical cells, and
d. operating the electrochemical cells at a current density to thereby degrade the pollutant in the wastewater.

Another method for wastewater treatment according to another embodiment of the present invention, comprises the steps of:
a. providing at least one stack of electrochemical cells comprising a cover attached to the compression frame of at least one electrochemical cell in the stack on the cathode side, the cover having one side with an opening facing the cathode catalyst layer side of the electrochemical cell, the stack being immersed in a reactor tank which contains the wastewater to be treated,
b. supplying cathode solution to the enclosure formed by the cover which is attached to the compression frame,
c. providing a voltage across the electrochemical cells, and
d. operating the electrochemical cells at a current density to thereby degrade the pollutant in the wastewater.

Another method for wastewater treatment is disclosed comprising the steps of:
a. providing at least one repeating unit comprising two electrochemical cells and a cover placed between the compression frames of two neighbouring electrochemical cells of the repeating unit, the cover having an opening on each of its two opposite side, each opening facing the cathode catalyst layer side of one of the two neighbouring cells, the stack being immersed in a reactor tank which contains the wastewater to be treated,
b. supplying a cathode solution to the enclosure formed by the cover and the compression frames of the two neighbouring cells,
c. providing a voltage across the electrochemical cells of the repeating unit, and
d. operating the electrochemical cells at a current density to thereby degrade the pollutant in the wastewater.

A method for wastewater treatment is disclosed comprising the steps of:
a. providing at least one repeating unit comprising two electrochemical cells and a cover placed between the compression frames of two neighbouring electrochemical cells of the repeating unit, the cover having an opening on each of its two opposite side, each opening facing the anode catalyst layer side of one of the two neighbouring cells, the stack being immersed in a reactor tank which contains the wastewater to be treated,
b. supplying an anode solution to the enclosure formed by the cover and the compression frames of the two neighbouring cells,
c. providing a voltage across the electrochemical cells of the repeating unit, and
d. operating the electrochemical cells at a current density to thereby degrade the pollutant in the wastewater A method for wastewater treatment is disclosed comprising the steps of:
a. providing at least one repeating unit comprising two electrochemical cells and a cover placed between the compression frames of two neighbouring electrochemical cells, the cover having an opening on each of its two opposite side, each opening facing the anode catalyst layer side of one of the two neighbouring cells, the stack being immersed in a reactor tank which contains a cathode solution,
b. supplying wastewater to the enclosure formed by the cover and the two compression frames of the two neighbouring cells of the repeating unit,
c. providing a voltage across the electrochemical cells, and
d. operating the electrochemical cells at a current density to thereby degrade the pollutant in the wastewater.

BRIEF DESCRIPTION OF THE DRAWINGS

The drawings illustrate specific preferred embodiments of the invention, but should not be considered as restricting the spirit or scope of the invention in any way.

DETAILED DESCRIPTION

Certain terminology is used in the present description and is intended to be interpreted according to the definitions provided below. In addition, terms such as "a" and "comprises" are to be taken as open-ended. Further, all US patent publications and other references cited herein are intended to be incorporated by reference in their entirety.

Herein SPE stands for solid polymer electrolyte and can be any suitable ion conducting ionomer (either of anion or cation, organic or inorganic form), such as Nafion®. A SPE electrochemical cell is thus a cell comprising a SPE as the electrolyte to which electrical energy is supplied to effect a desired electrochemical reaction (with a positive voltage being applied to the anode of the cell).

Figure 1:
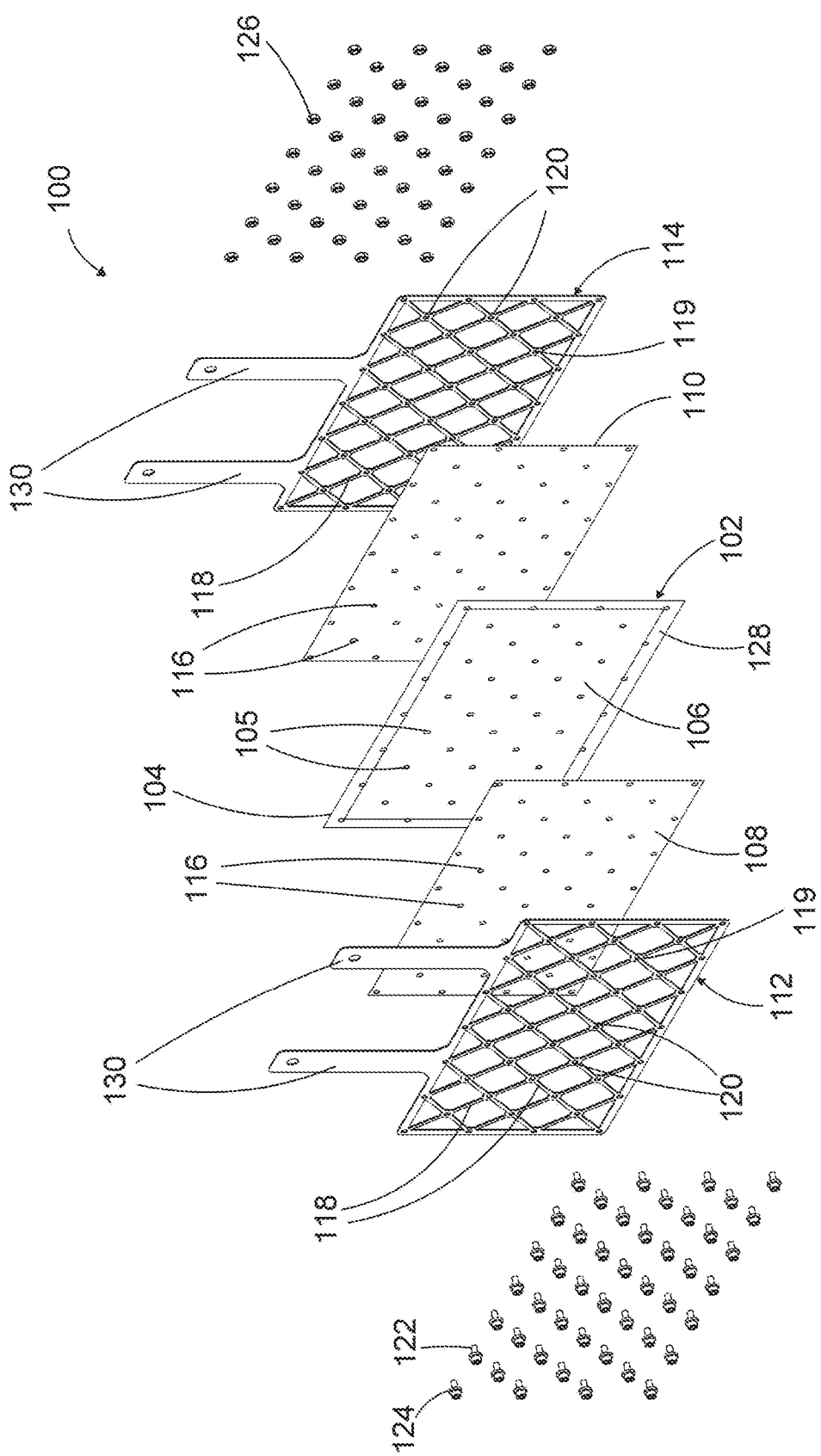
FIG. 1 illustrates an exploded view of an electrochemical cell for wastewater treatment used in the present system.

An exemplary electrochemical cell for wastewater treatment used in the present system is illustrated in its exploded view in FIG. 1. Electrochemical cell 100 comprises a catalyst coated membrane 102 (CCM) which consists of a solid polymer electrolyte membrane 104 coated with a catalyst layer 106 on each of its two sides. Only one catalyst layer 106 on a first side of the membrane is shown in FIG. 1, for example this could be the anode catalyst layer, but a person skilled in the art would easily understand that the opposite side of the membrane is also coated with a catalyst layer which in this example would be the cathode catalyst layer, and which can have substantially the same area as the anode catalyst layer. In this context, in the present disclosure, the anode active area of the electrochemical cell is defined as the area of the membrane (or of the open pore mesh as further described below in alternative embodiments) coated with a catalyst layer on the anode side and the cathode active area is defined as the area of the membrane (or of the open pore mesh) coated with a catalyst layer on the cathode side. In the illustrated embodiment, the solid polymer electrolyte membrane 104 is provided with holes 105 which allow the penetration of fasteners 122 through the membrane during the assembly of the electrochemical cell as further described below. In alternate embodiments, solid polymer electrolyte membrane 104 is not prefabricated with holes and, in this case, the fasteners penetrate the membrane during the assembly process of the electrochemical cell. The electrochemical cell further comprises open pore meshes 108 and 110, which are placed next to the catalyst coated membrane 102, on each side of the CCM, and compression frames 112 and 114, which are each placed next to the open pore meshes 108 and respectively 110. Open pore meshes 108 and 110 are meshes provided with open pores to allow a relatively large porosity of the mesh and they are also provided with holes 116 which allow the penetration of fasteners 122 during the assembly of the electrochemical cell. The area of each of the open pore meshes 108 and 110 is substantially the same as the anode active area and respectively the cathode active area of the electrochemical cell which is the catalyst coated area of the membrane. Area 128 at the periphery of the CCM (102), along its perimeter, is not coated with catalyst and has an electrical isolation function.

Compression frames 112 and 114, which in the illustrated example have the shape of a rectangle with four sides, are each provided with compression arms 118 connected to each other at connection sites 120 and being spread within the area between the four sides of the compression frame. Holes 119 are provided in the compression frames at connection sites 120 for allowing the penetration of fasteners 122 during the assembly of the electrochemical cell. The connection sites are distributed within the area between the four sides of each compression frame. Compression frames 112 and 114 are provided with leads 130 to make electrical connections with a power supply, generally a DC power supply. A person skilled in the art would understand that the compression frames 112 and 114 can have a different shape than the rectangular shape illustrated in the present figures and the compression arms 118 and connection sites 120 are distributed for each compression frame within the area delimited by its perimeter. In the case of a compression frame of a rectangular shape the perimeter of the frame is defined by its sides.

Figure 2:
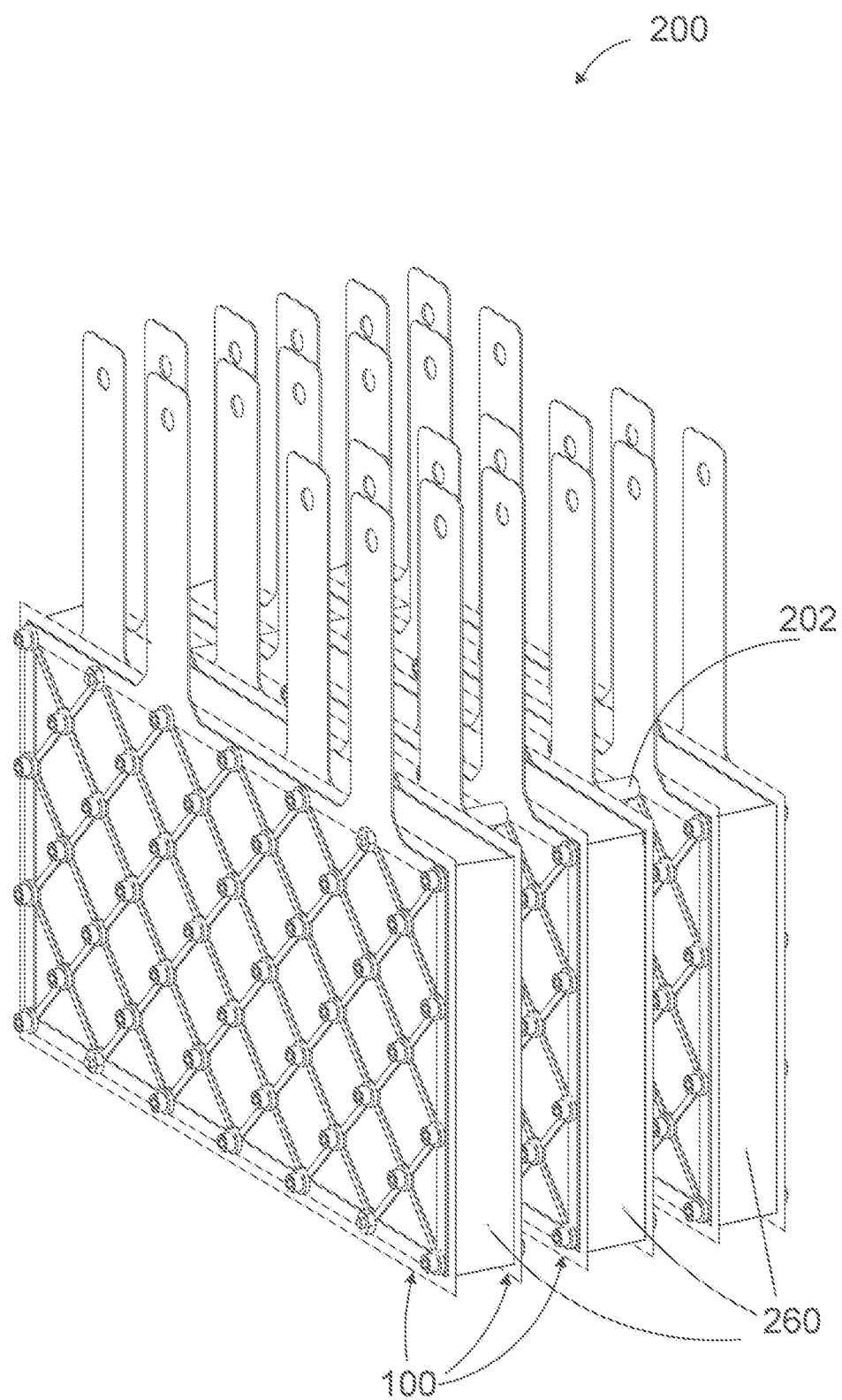
FIG. 2 illustrates a schematic of a stack of electrochemical cells comprising a cover which is placed between the cathodes of two neighbouring cells in the stack, according to the present system.
Figure 3:
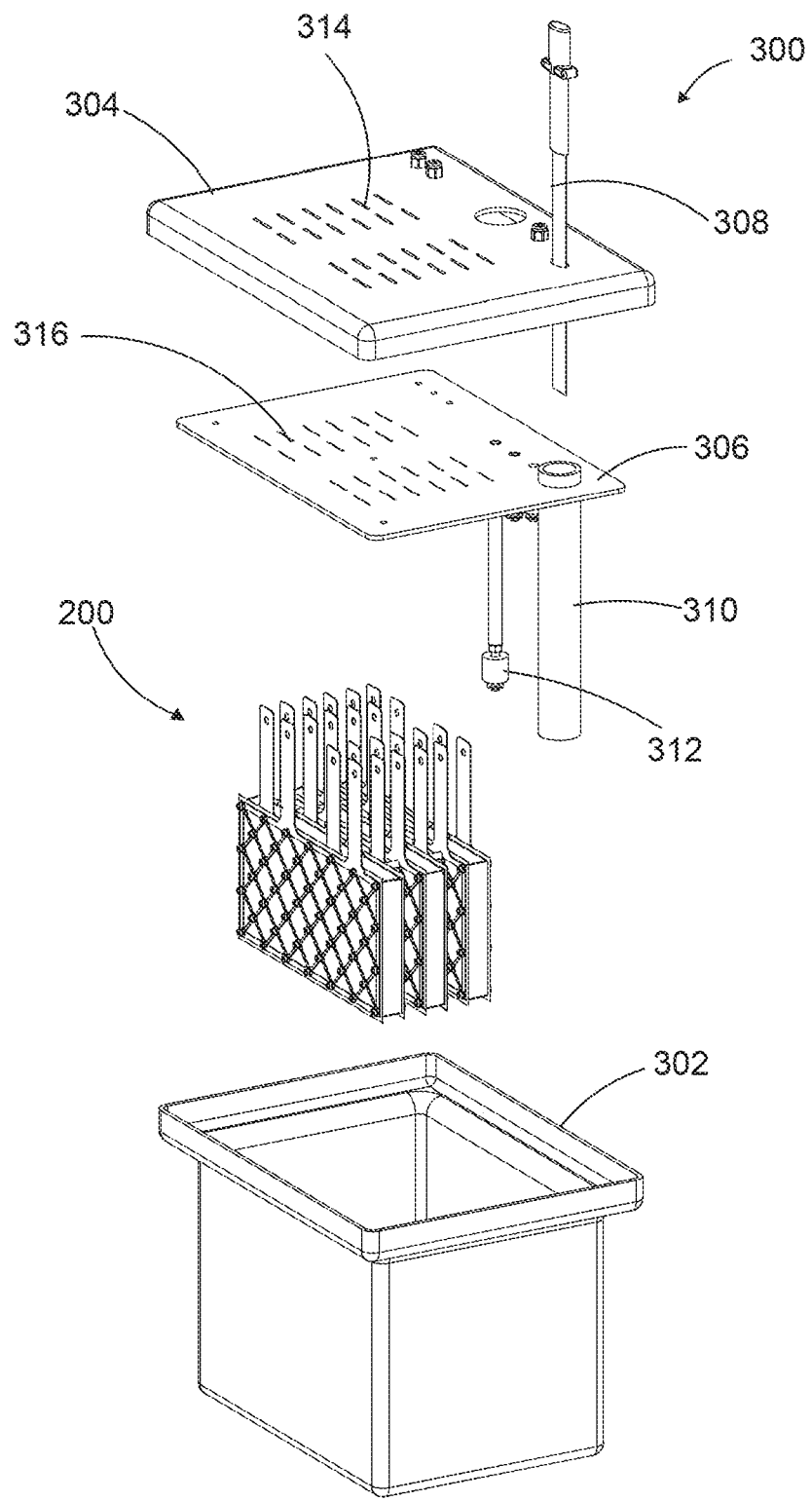
FIG. 3 illustrates an exploded view of a module for wastewater treatment comprising a reactor tank and the stack of electrochemical cells illustrated in FIG. 2.

In FIGS. 1 through 3, fasteners 122 are illustrated as threaded bolts which cooperate with nuts 126 to ensure the required compression force, but a person skilled in the art would easily understand that any other fasteners, for example rivets can be used for providing the compression force exerted by the compression frames on the open pore meshes and on the CCM and such fasteners might not require any additional elements such as nuts 126 for ensuring the required compression force.

The SPE membrane 104 provides a reduced gap between the electrodes (the catalyst layers on the anode and cathode side of the membrane). In the present invention, there are no gas diffusion layers to support the catalyst layers and the electrodes comprise only the anode and the cathode catalyst layers 106, each deposited, in this embodiment, on one side of the membrane, which also contributes to a lower operating cost. Open pore meshes 108 and 110 provide the local current collection and, due to their relatively high porosity, allow easy access of the polluted water and of treated water to and from the reaction sites on the catalyst layers and easy removal of the gases formed next to the catalyst layer. Compression frames 112 and 114 allow the perimeter current collection for open pore meshes 108 and 110 and their compression arms 118 achieve a substantially uniform compression of the open pore meshes, of the membrane and of the catalyst layers across the entire anode and respectively cathode active area mainly due to the distribution of the compression arms and respectively of the connection sites. Compression frames 112 and 114 are made of conductive metals or ceramics with a thickness of 0.5 to 5 mm, for example. A person skilled in the art would understand that the number of connection sites and the aspect ratio of the compression frames can vary and can be configured to allow a substantially uniform compression of the open pore meshes and of the CCM and to accommodate different sizes of commercially available solid polymer membranes.

Open pore meshes 108 and 110 have a relatively high porosity for the purposes mentioned above. In the context of the present invention, porosity is defined as the ratio between the open area and the volume of the mesh. Types of meshes that can be used include but are not limited to a sintered titanium fibre mesh supplied by Bekaert having a mesh thickness of between 250 to 550 microns, a fibre diameter of between 22 to 50 microns and a porosity of 50 to 85% and an expanded metal mesh supplied by Dexmet having a mesh thickness of between 10 to 5,000 microns, a strand width of between 0.04 to 0.055 inches with a porosity of between 30 and 95%, with about 33 to 493 openings per square inch and with diamond shaped openings having dimensions of between 0.075 to 0.289 inches for LWD (long way of diamond) and between 0.032 to 0.2 inches for SWD (short way of diamond), where the LWD and SWD are the dimensions of the diagonals of the diamond shaped openings, as explained, for example, on the supplier's website. Preferably open pore meshes are made of conductive metals or ceramics and have a thickness of between 10 to 5,000 microns and a porosity of between about 30 to 95%.

The electrochemical cell is assembled together by compressing the CCM 102 between the open pore meshes 108 and 110 and between compression frames 112 and 114, using fasteners 122 which pass through holes 119 provided in the compression arms 118 at connection sites 120, through the holes 116 provided in the open pore meshes 108 and 110, through the catalyst layers 106 and through the holes 105 provided in the solid polymer electrolyte membrane 104. When solid polymer electrolyte membrane 104 does not comprise any holes, fasteners 122 can penetrate directly through the membrane when the electrochemical cell is assembled. Fasteners 122 can be provided with washers 124 which spread the compression force from the fasteners to compression arms 118 or alternatively can have a shape that allows the spreading of the compression force.

Fasteners 122, washers 124 and nuts 126 are made of non-conductive materials. In the electrochemical cell of the present invention fasteners 122 penetrate through the connection sites, the open pore meshes and the CCM to ensure a substantially uniform distribution of the compression force across the entire active areas of the electrochemical cell and to maintain a reduced gap between the electrodes. This is different than the compression systems described in the existing prior art where the compression of the electrochemical cell is achieved only by the peripheral compression of frames through spring loaded bolts to avoid the penetration of any compression means through the SPE, more specifically through the SPE membrane.

A stack of electrochemical cells used in the present system is illustrated in FIG. 2. Stack 200 comprises a plurality of electrochemical cells 100 having the same configuration as the one illustrated in FIG. 1 described above. The cells are connected to each other through at least one rod 202 which provides the required spacing between the individual electrochemical cells 100. The illustrated stack comprises 6 electrochemical cells, but a person skilled in the art would easily understand that a stack according to the present invention can comprise more electrochemical cells or, for some very small scale applications, less than 6 electrochemical cells. In preferred embodiments, one stack comprises 50 cells, but stacks can comprise up to about 500 individual electrochemical cells. Covers 260 are placed between neighbouring cells 100 to isolate the cathodes of two neighbouring cells from the solution in the reactor tank as further explained below and illustrated in FIG. 4.

As further illustrated in the embodiments of the present invention, when assembled in a stack, the electrochemical cells can be arranged such that the anode side of one electrochemical cell is facing the cathode side of the neighbouring cell or such that the cathode side of one electrochemical cell is facing the cathode side of the neighbouring cell and the anode side of one electrochemical cell is facing the anode side of the neighbouring electrochemical cell.

A module 300 for wastewater treatment comprises a stack 200 of electrochemical cells immersed in a reactor tank as illustrated, in an exploded view, in FIG. 3. Stack 200 is contained within reactor tank 302 such that one electrode of each of the electrochemical cells in the stack (either the anode or the cathode, as further described below) is exposed directly to the wastewater and pollutants or to the solution contained in the reactor tank while the other electrode is isolated from the wastewater or the solution in the reactor tank by the cover. Module 300 further comprises an outer lid 304 provided with feed ports (not illustrated) and gas venting ports 314 and an inner lid 306 which is also provided with feed ports (not illustrated) and gas venting ports 316, both inner and outer lids covering the reactor tank 302 at its upper part to contain the wastewater and stack 200 and to control the emissions from the module. Module 300 is also provided with a level sensor 308 to ensure that the stack operation is halted when the water level is below a desired threshold, which provides protection for the membrane and the electrode system from resistive burnout and non-uniform hydration. Within the reactor tank, level sensor 308 which is used for monitoring the water level within the tank is housed within a tube 310. Module 300 is further provided with a level switch 312 for stopping the flow of wastewater into the reactor tank when the level in the tank reaches a predetermined level.

Figure 9:
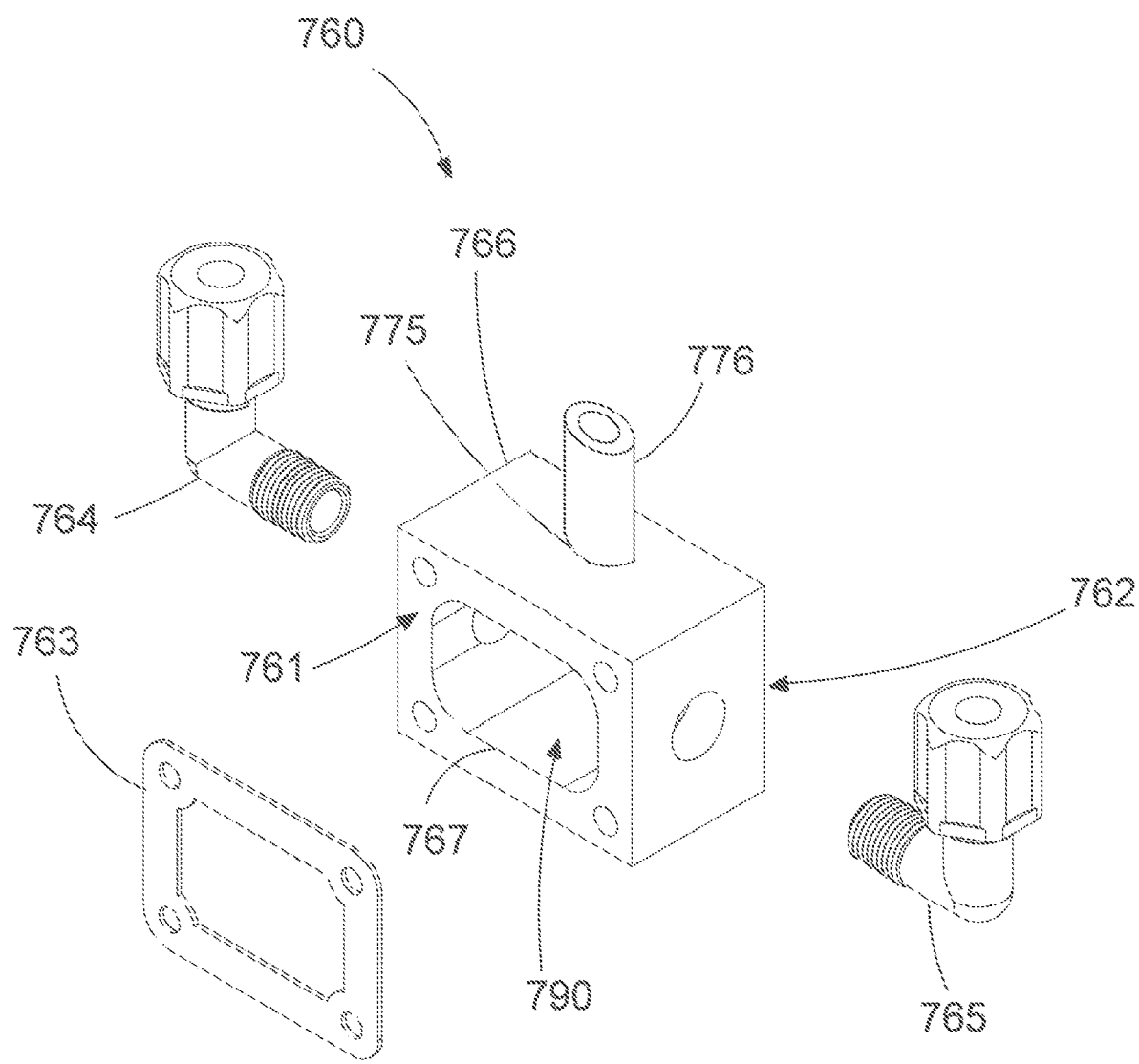
FIG. 9 illustrates an exploded view of a cover which can be attached to one of the electrochemical cells in the stack as illustrated in FIG. 8.

The covers placed between two neighbouring cells are only schematically illustrated in FIGS. 2 and 3 and a person skilled in the art would easily understand that each cover can comprise additional elements, for example inlet and outlet pipes and a venting pipe as further described below and illustrated in FIGS. 5 and 9.

In a schematic review of the reactions taking place at the individual electrochemical cell level in a stack of electrochemical cells from the prior art, having both the anode and the cathode directly exposed to wastewater, more specifically to wastewater containing ammonia, the electrochemical oxidation process on the anode falls into the categories of direct, indirect surface mediated, and indirect secondary oxidant mediated oxidation with the specific reactions dependent on the type of solid polymer electrolyte (SPE) used, the choice of catalyst, and the composition of the wastewater solution. A positive charge carrier is transferred using a cation SPE while a negative charge carrier is transferred using an anion SPE. On the anode side, when polluted wastewater is exposed to the anode catalyst layer a step-wise oxidation process takes place which involves either a direct, indirect surface mediated or indirect secondary oxidant mediated oxidation as shown in Equations 1 to 3 for a cation SPE and Equations 6 and 7 for an anion SPE, respectively.

For a cation SPE-based cell, when wastewater (for example wastewater with an ammonia pollutant) is exposed to the anode catalyst layer, a step-wise oxidation process takes place at the anode involving either a direct oxidation, as shown in Equation 1, or an indirect oxidation, as shown in Equations 2(a) and 2(b) or in Equations 3(a) and 3(b):

Equation 1: Direct oxidation of ammonia (anode half reaction):

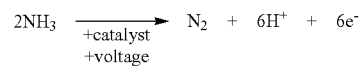

Equation 2: Indirect oxidation of ammonia (anode half reaction) via (a) production of hydroxyl surface species from water and (b) oxidation of ammonia via surface hydroxyl species:

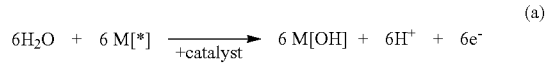

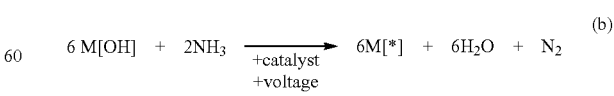

Equation 3: Indirect secondary oxidant mediated oxidation of ammonia (anode half reaction) via (a) production of hypochlorite species from NaCl and (b) indirect oxidation of ammonia via hypochlorite:

$$6NaCl \xrightarrow[+voltage]{+catalyst} 6Na^+ + 6e^- + 3Cl_2 \quad (a)$$

$$3Cl_2 + 3H_2O \underset{pH,T,P}{\longleftrightarrow} 3HOCl + 3HCl$$

$$3HOCl + 1NH_3 \xrightarrow{pH,T,P} 3H_2O + \frac{1}{2}N_2 + \frac{3}{2}Cl_2 \quad (b)$$

For a cation SPE-based electrochemical cell where the anode half reaction is illustrated in Equations 1 or 2, the cathode reaction involves the direct production of hydrogen from protons transported across the SPE, as illustrated in Equation 4:

$$6H^+ + 6e^- \xrightarrow[+voltage]{+catalyst} 3H_2$$

For a cation SPE-based electrochemical cell where the anode half reaction is illustrated in Equation 3, the cathode reaction involves the direct production of sodium hydroxide via the transport of sodium ions across the SPE, as illustrated in Equation 5(a). The sodium hydroxide then undergoes a subsequent reaction in solution with products of the anode reaction to reform the salt and water, as illustrated in Equation 5(b).

Equation 5:

$$6Na^+ + 6e^- + 6H_2O \xrightarrow[+voltage]{+catalyst} 3H_2 + 6NaOH \quad (a)$$

$$6NaOH + 6HCl \xrightarrow{T,P} 6NaCl + 6H_2O \quad (b)$$

Alternatively, for an anion SPE-based electrochemical cell, when wastewater (in this case an ammonia pollutant) is exposed to the anode catalyst layer a step-wise indirect oxidation process takes place at the anode, involving either hydroxyl surface species or hypochlorite as shown in Equation 6 and Equation 7, respectively:

Equation 6: Indirect oxidation of ammonia (anode half reaction) via surface hydroxyl species:

$$2NH_3 + 6OH^- \xrightarrow[+voltage]{+catalyst} N_2 + 6H_2O + 6e^-$$

Equation 7: Indirect oxidation of ammonia (anode half reaction) via (a) production of hypochlorite species from Cl ions transport across the SPE and (b) indirect oxidation of ammonia via hypochlorite:

$$6Cl^- \xrightarrow[+voltage]{+catalyst} 3Cl_2 + 6e^- \quad (a)$$

$$3Cl_2 + 3H_2O \underset{pH,T,P}{\longleftrightarrow} 3HOCl + 3HCl$$

$$3HOCl + 1NH_3 \xrightarrow{pH,T,P} 3H_2O + \frac{1}{2}N_2 + \frac{3}{2}Cl_2 \quad (b)$$

For an anion SPE-based electrochemical cell where the anode half reaction is illustrated in Equation 6, the cathode reaction involves the production of hydroxyl charge carriers and hydrogen from water, as illustrated in Equation 8:

$$6H_2O + 6e^- \xrightarrow[+voltage]{+catalyst} 6OH^- + 3H_2$$

For an anion SPE-based electrochemical cell where the anode half reaction is illustrated in Equation 7, the cathode reaction involves the production of chlorine ion charge carriers and hydrogen from NaCl and water, as illustrated in Equation 9:

$$6H_2O + 6NaCl + 6e^- \xrightarrow[+voltage]{+catalyst} 6NaOH + 3H_2 + 6Cl^-$$

The reactions shown in Equations 1 to 3 and, respectively in Equations 6 and 7 are anode half-reactions and, as a person skilled in the art would know, in many cases there could be numerous intermediate steps in the reactions and as result there could be many intermediate species. However such intermediate species are generally oxidized to a final product which typically comprises $CO_2$ for carbon containing pollutants, $N_2$ for nitrogen-containing pollutants and $SO_x$ for sulphur containing pollutants.

At the cathode, pollutants can also be reduced when in contact with the cathode catalyst layer and such reduction reactions may also assist in the stepwise removal of the wastewater pollutants and the oxidation of the intermediate compounds formed at the anode.

In a system where a stack of electrochemical cells where both the anode and the cathode are directly exposed to the wastewater in the reactor tank, as described in the prior art, some of the intermediary species produced at the anode or which exist as background species in the wastewater are not entirely oxidized and can be carried by the wastewater and can reach the cathode poisoning it. For example, background organic species may polymerize on the cathode and/or trace metals in solution may electro-deposit on the cathode preventing it from carrying out the desired electrochemical reactions shown in Equations 5(a), 5(b), 8, and 9.

Furthermore, the wastewater reduction process which takes place at the cathode in the case of ammonia indirect oxidation process can electrochemically reduce intermediate ammonia oxidation products from the overall ammonia oxidation reaction which can get mixed with the wastewater in the tank thus reaching the cathode and diminishing the efficiency of the system in removing the ammonia from the wastewater.

During the indirect oxidation of ammonia, salt (NaCl) is added to the contaminated wastewater to be oxidized at the anode and used to generate in-situ hypochlorite species which can oxidize the ammonia contaminants in the wastewater. The salt from the wastewater can mix with the decontaminated water in the tank and reach the piping which transports the clean water from the tank to selected discharge locations such as a municipal wastewater treatment plant, which can increase the piping corrosion.

The present invention addresses all the disadvantages presented above and thereby further increases the system's removal rate, whereby it describes a system where the anode, or respectively the cathode of at least one of the electrochemical cells in the stack is isolated from the solution in the tank.

Figure 4:
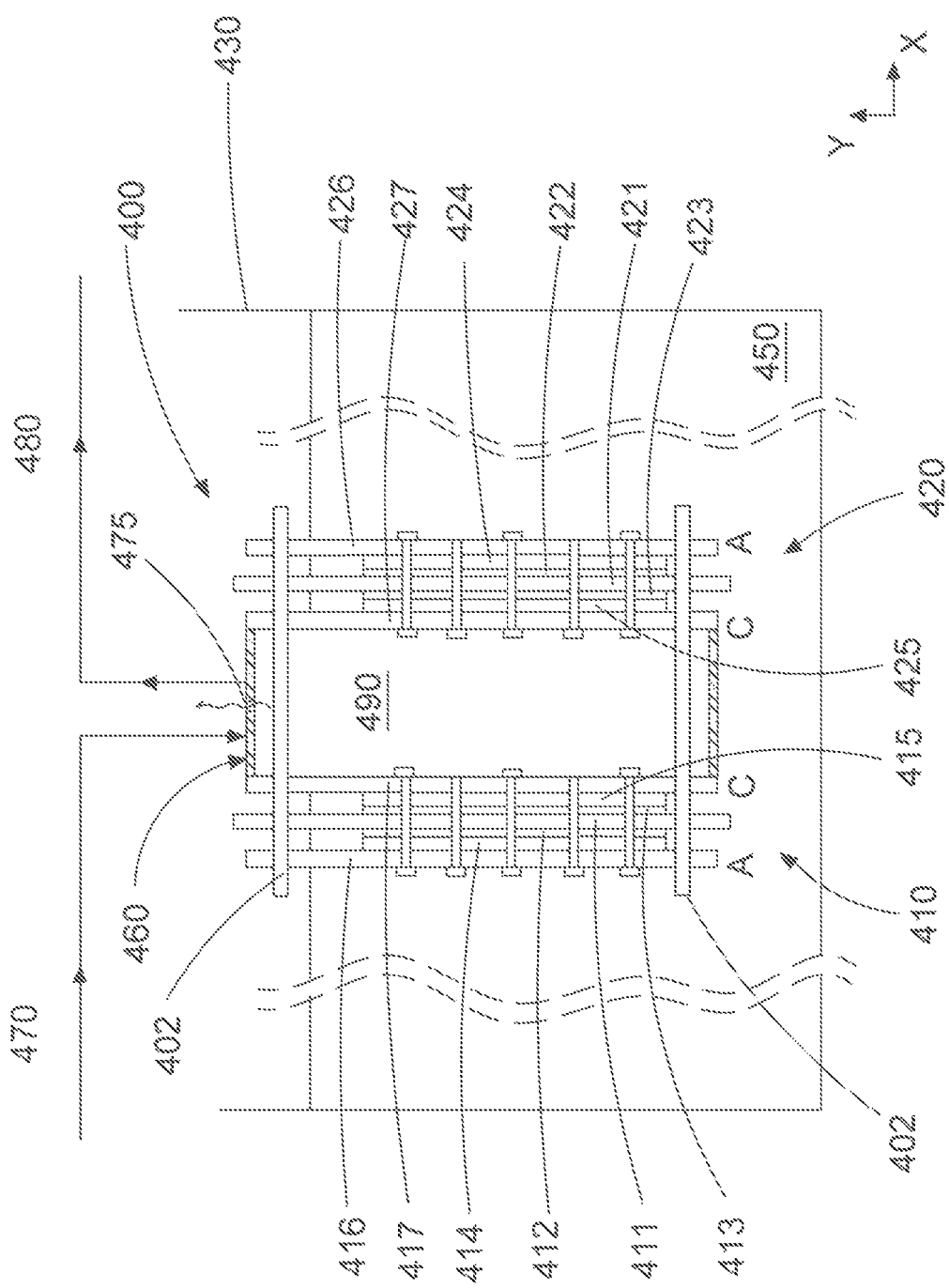
FIG. 4 illustrates a schematic of the stack of electrochemical cells according to the first embodiment of the present invention.

The first embodiment of the present system is illustrated schematically in FIG. 4. The system is illustrated having a stack comprising a repeating unit 400 which comprises two electrochemical cells, 410 and 420 with their cathode side "C" facing each other, and a person skilled in the art would understand that a stack according to the present invention can comprise more repeating units 400 which are assembled together through at least one rod 402 such that each anode of the electrochemical cells in one repeating unit 400 is facing the anode of one of the electrochemical cells in the repeating unit located next to it.

Each of the two electrochemical cells 410 and respectively 420 comprises a catalyst coated membrane (CCM) which consists of a solid polymer electrolyte membrane 411, and respectively 421 coated on one side with an anode catalyst layer 412, and respectively 422 and on the other side with a cathode catalyst layer 413, and respectively 423. Each electrochemical cell further comprises open pore meshes 414 and 415, and respectively, 424 and 425 which are placed next to the anode and respectively to the cathode catalyst layers, on each side of the catalyst coated membrane, and compression frames 416 and 417, and respectively, 426 and 427 which are each placed next to an open pore mesh. As described in relation to FIG. 2, and further illustrated in FIG. 4, the cells are connected to each other through rods 402 which provide some spacing between the individual cells 410 and 420. Even if in FIG. 4 the assembly is illustrated as having two rods 402, a person skilled in the art would understand that at least one rod 402 is needed for positioning the electrochemical cells in the stack at a desired spacing between them.

A cover 460 is placed between the two electrochemical cells 410 and 420, connecting compression frames 417 and 427 which are each placed next to an open pore mesh on the cathode side of each of the two neighbouring electrochemical cells 410 and 420. The cover creates an enclosure 490, between the cathodes of these electrochemical cells, which is impermeable to wastewater and thereby isolates the cathodes from the wastewater in the tank. The schematic illustration of the assembly in FIG. 4 shows a gap between the two compression frames 416 and 417 and the solid polymer membrane 411 and respectively between compression frames 426 and 427 and the solid polymer membrane 421, and a person skilled in the art would understand that, because the dimensions of the catalyst layers and open pore meshes along the X axis are very small (for example, less than 5 mm) and because the compression system compresses these elements together, there is a very small gap between the compression frames 416 and 417 and membrane 411, and respectively between compression frames 426 and 427 and membrane 421. Some portions of the membranes 411 and 421 extend beyond the active areas (catalyst coated areas of the membranes) and are interposed between the compression frames to electrically isolate them from each other.

The entire stack formed from repeating units 400 is immersed in a tank 430 which contains contaminated wastewater 450.

A cathode solution 470 is fed to the enclosure 490 and the product 480 of the reactions which take place on the cathode side is removed from the enclosure. During the ammonia removal process, for example, a solution 470, comprising a salt (NaCl) and water, is fed into the enclosure 490. The chlorine ions (Cl-) are transferred to the anode side through the anion exchange membrane forming hypochlorous acid (HClO) which is further used for ammonia oxidation and removal from wastewater. The product 480 of the reactions taking place on the cathode side (comprising for example NaOH) is flushed out of the enclosure. A venting orifice 475 is provided for allowing the elimination of the gases (such as hydrogen) produced during the reactions taking place on the cathode side.

Figure 5:
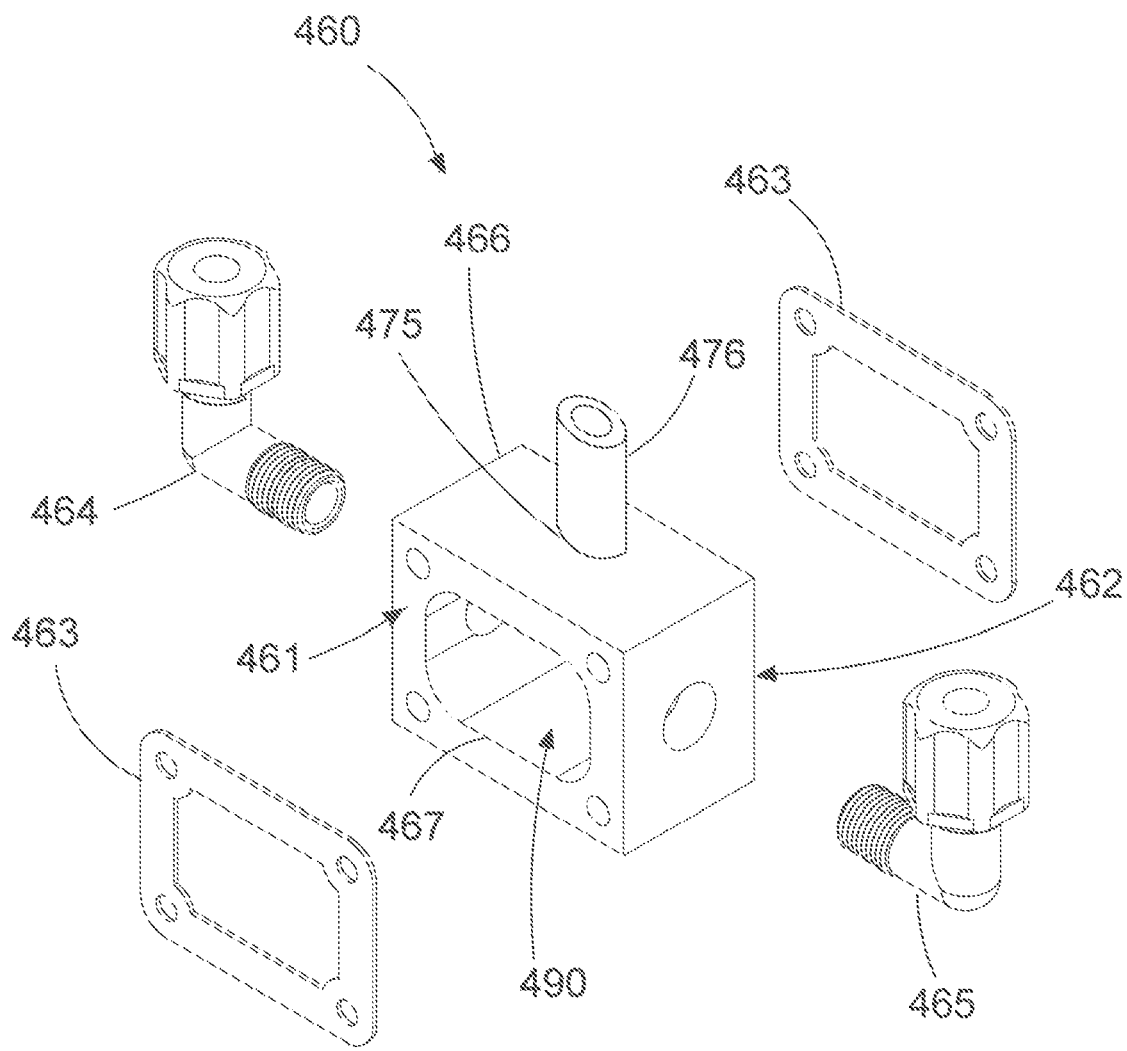
FIG. 5 illustrates an exploded view of a cover which can be placed between two neighbouring cells according to the present invention.

A tridimensional view of the cover 460 is illustrated in FIG. 5. The cover comprises a body 466 having two sides 461 and 462, opposite to each other, which, in the assembled stack of the embodiment illustrated in FIG. 4, are placed next to the compression frames facing the cathode side of each of the two neighbouring electrochemical cells. Each of the sides, 461 and respectively 462, is provided with an opening 467 to allow the access of the cathode solution introduced through the inlet pipe 464 to the cathode side of an electrochemical cell in an assembled stack and with a seal 463 which prevents the wastewater leaking from the reactor tank into the enclosure 490 formed by the cover and the compression frames of the neighbouring cells in the assembled stack and prevents the cathode solution from leaking from the enclosure 490 into the reactor tank. The cover is provided with an inlet pipe 464 through which a cathode solution 470 can be flown into the enclosure, and an outlet pipe 465 through which the product 480 of the reactions taking place at the cathode catalyst can be flown out of the enclosure. A venting pipe 476 is provided to allow the venting of gases from the enclosure 490 through the venting orifice 475 to the atmosphere or to a gas containment tank. Inlet pipe 464, and outlet pipe 465 and vent pipe 476 can be threaded in the body of the cover, they can be molded with the body of the cover or welded thereto. It should be understood that the location of the inlet and outlet pipes on the cover can vary according to the stack design of the different embodiments of the present invention, but generally the covers are each provided with an inlet pipe, an outlet pipe and a vent pipe.

The electrochemical cells illustrated in FIG. 4 have a similar construction as the one described in the applicant's co-pending application 62/279,631 and illustrated in FIG. 1. This applies to all the embodiments of the present invention.

Figure 6:
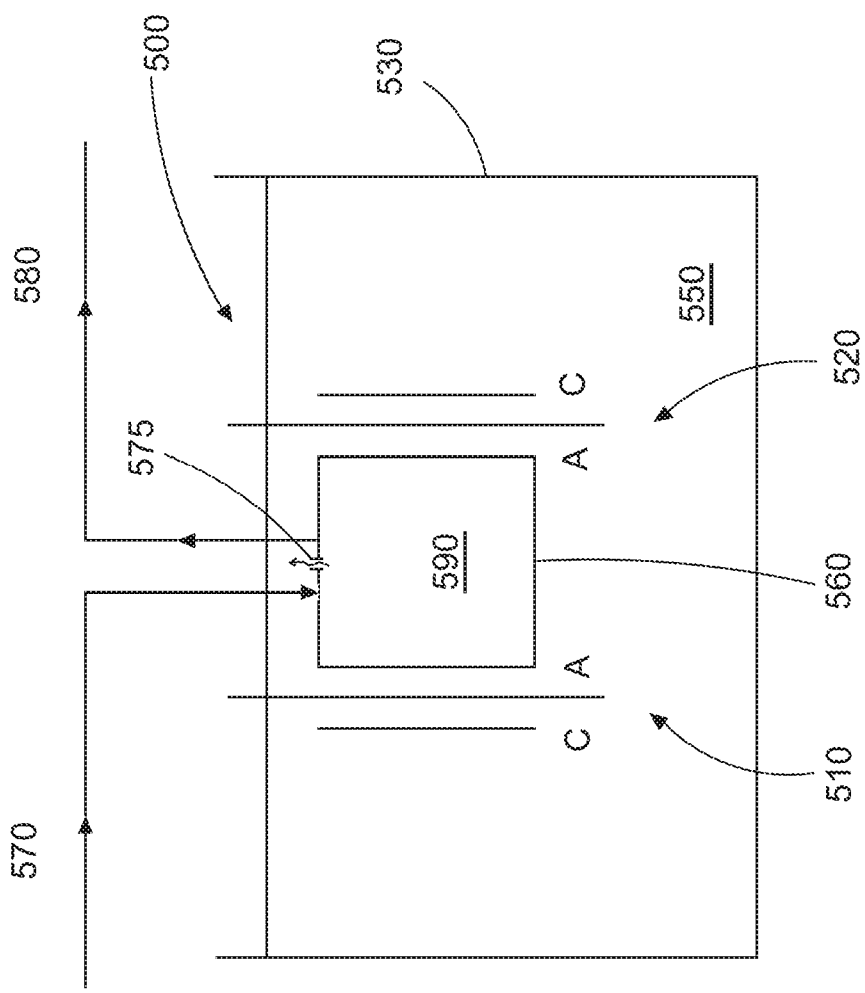
FIG. 6 illustrates a schematic of a stack of electrochemical cells comprising a cover which is placed between the anodes of two neighbouring cells in a stack immersed in wastewater in a reactor tank, according to the present invention.

The electrochemical cells in the stack illustrated in FIG. 4 are arranged to have the cathodes of two neighbouring electrochemical cells facing each other and being exposed to the enclosure 490 formed by the cover 460 to be thereby isolated from the wastewater solution in the tank. In yet another embodiment of the present invention, schematically illustrated in FIG. 6, the electrochemical cells are assembled in a stack by having the anode sides "A" of two neighbouring electrochemical cells 510 and 520 facing each other, such that the catalyst layers on the anode sides of electrochemical cells 510 and 520 are exposed to an enclosure 590 formed by the cover 560 with the compression frames of the two neighbouring cells, and are thereby isolated from the wastewater solution 550 in the tank. FIG. 6 does not show further details of the construction of each electrochemical cell or of the cover, but it should be understood that the electrochemical cells in this embodiment have the same construction as the electrochemical cells illustrated in FIGS. 1 to 5, more specifically comprising a catalyst coated membrane placed between two open pore meshes and two compression frames and, fasteners protruding through the assembly formed by the CCM, meshes and compression frames for ensuring the stack compression. Cover 560 has a similar construction to the cover illustrated in FIG. 5.

In the embodiment illustrated in FIG. 6, the stack comprising at least one repeating unit 500 is immersed in wastewater 550 within reactor tank 530. A cover 560 is placed between the compression frames of the two neighbouring electrochemical cells 510 and 520, which are located on the anode ("A") side of each electrochemical cell. Cover 560 forms an enclosure 590 which isolates the anodes (anode catalyst layers) of these two electrochemical cells from the wastewater in the reactor tank. In this embodiment the contaminants in the wastewater are reduced on the cathode ("C") side of the electrochemical cells, while an anode solution 570 comprising for example $H_2O$ and, in some cases, an electrolyte such as NaOH or $H_2SO_4$ is introduced into the enclosure 590 to reach the anodes of the electrochemical cells 510 and 520. On the anode side, water is electrolyzed to form protons which cross to the cathode side. On the cathode side, the protons participate in the electroreduction of wastewater compounds (such as nitrate, nitrite or urea). The reaction products 580 are flown out of the enclosure 590. Reaction gases ($O_2$, $N_2$, etc.) are vented out of the enclosure through venting orifice 575.

Figure 7:
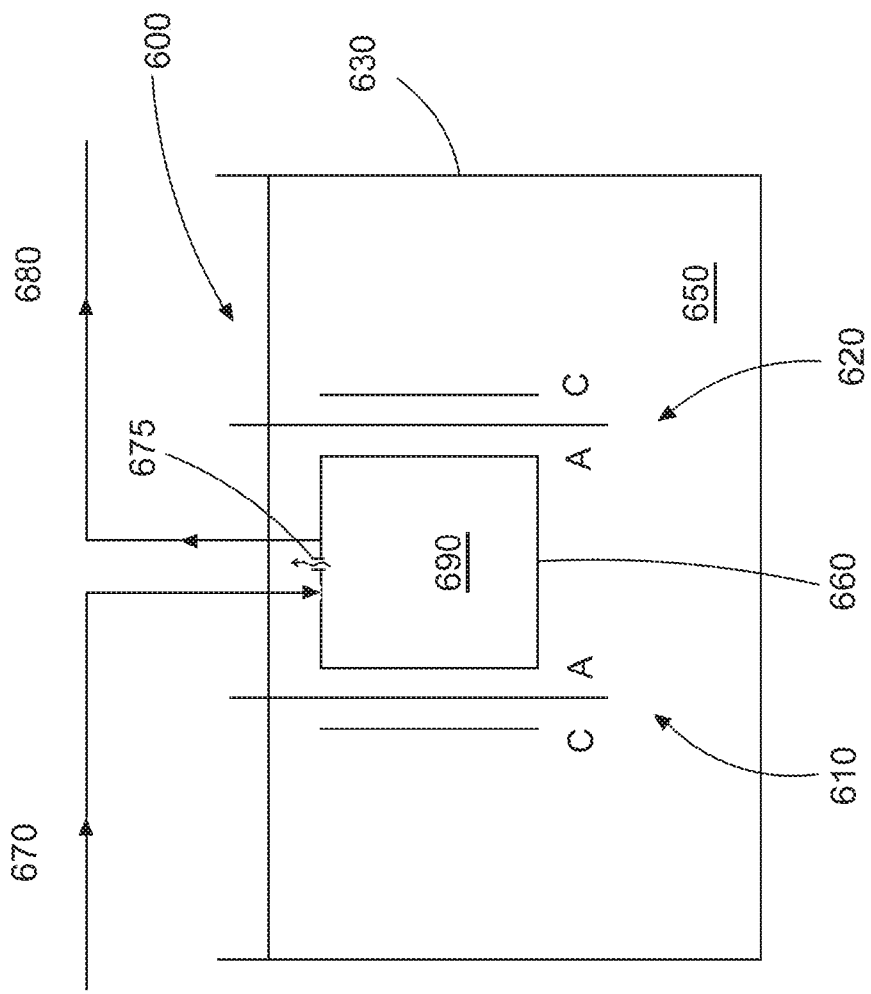
FIG. 7 illustrates a schematic of a stack of electrochemical cells comprising a cover which is placed between the anodes of two neighbouring cells in a stack immersed in cathode solution, in a reactor tank, where the wastewater is circulated through the enclosure formed by the cover and the two neighbouring cells.

In the embodiment illustrated in FIG. 7, a stack comprising at least one repeating unit 600 is immersed in a cathode solution 650 within a reactor tank 630. A cover 660 is placed between the compression frames (not illustrated) of two neighbouring cells 610 and 620, on their anode ("A") side, to create an enclosure 690 which isolates the anodes (anode catalyst layers) of the two neighbouring electrochemical cells from the solution in the reactor tank. A stream of wastewater 670 is introduced into the enclosure 690 and the wastewater is oxidized at the anodes of the electrochemical cells such that the contaminants are removed, and a stream of clean water 680 is flown out of the enclosure 690. A venting orifice 675 is provided for allowing the elimination of the gases produced during the reactions taking place on the anode side. The construction of the embodiment illustrated in FIG. 7 is the same with the one of the embodiment illustrated in FIG. 6 the only difference being that the solution in the reactor tank in FIG. 7 is a cathode solution instead of wastewater and that wastewater instead of anode solution is circulated through the enclosure 690.

The reactions that take place at the anode and the cathode of the electrochemical cells 610 and 620 are similar to the ones that take place in the embodiment illustrated in FIG. 4. For the ammonia removal process, for example, the cathode solution 650 within the tank comprises a salt (NaCl) and water. The chlorine ions Cl— are transferred to the anode side through the anion exchange membrane forming hypochlorous acid (HClO) which is further used, on the anode side, for ammonia oxidation and removal from wastewater. The product of the reactions taking place on the cathode side (comprising for example NaOH) remain within the tank. The hydrogen formed during the reactions taking place on the cathode side is vented or captured from the top of the reactor tank.

Figure 8:
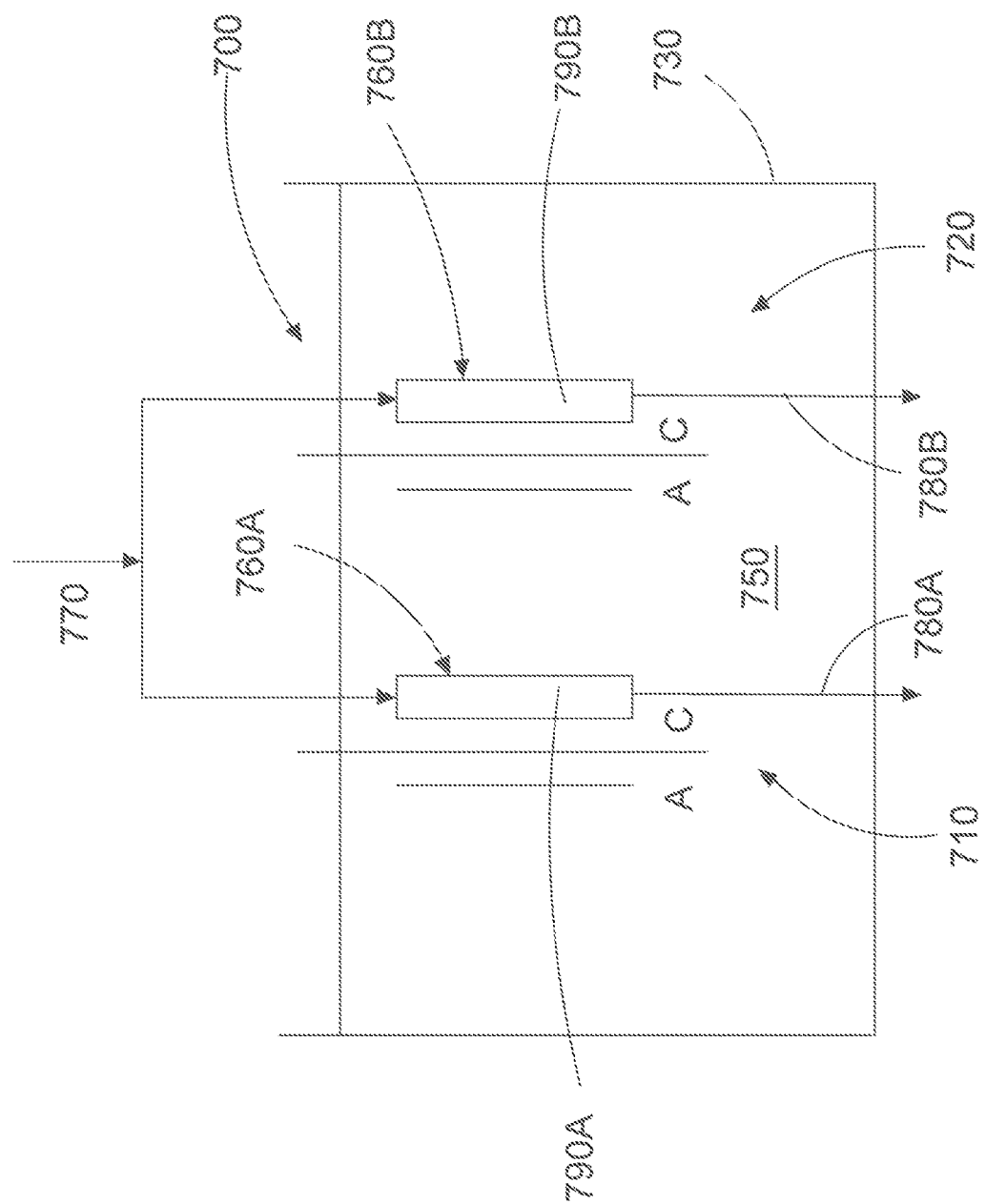
FIG. 8 illustrates a schematic of a stack of electrochemical cells having a cover placed on the cathode side of each of the cells in the stack.

Another embodiment of the present invention is illustrated in FIG. 8 which shows a stack 700 comprising electrochemical cells 710 and 720 which have a similar construction to the electrochemical cell illustrated in FIG. 1. A person skilled in the art would understand that the stack can comprise only one electrochemical cell or more cells, as needed. If the stack comprises more than one electrochemical cell, the electrochemical cells are preferably arranged such that the anode side A of one electrochemical cell faces the cathode side C of the neighbouring electrochemical cell in the stack, but other arrangements are also possible whereby the anode of one electrochemical cell is facing the anode of the neighbouring cell and the cathode of one electrochemical cell is facing the cathode of the neighbouring cell. Stack 700 is immersed in wastewater 750 within the reactor tank 730. A cover 760A, and respectively 760B is attached to a compression frame (not illustrated) of the electrochemical cell 710, and respectively 720, on the cathode side. A cathode solution 770 is fed into the enclosures 790A and 790B formed between the covers 760A and respectively 760B and the compression frames of the electrochemical cells placed on the cathode side and the reaction product streams 780A and 780B formed due to the reactions that take place at the cathodes are removed from the enclosures.

The contaminants in the wastewater are removed by the oxidation reactions taking place on the anode catalyst and the intermediate products formed on the cathode side that cross over the membrane to the anode side also contribute to the removal of contaminants, similarly with the process described for example in relation to the ammonia oxidation which takes place at the anode in the case of the embodiment illustrated in FIG. 4. Even if not shown in the schematic representation of FIG. 8, covers 760A, 760B are provided with venting orifices to allow the venting of gases from enclosures 790A and respectively 790B, which are similar with the venting orifice 775 illustrated in FIG. 9.

In another embodiment of the present invention, not illustrated, a stack of electrochemical cells, with the anode of one electrochemical cell facing the cathode of a neighbouring cell, comprises at least one electrochemical cell having a cover attached to its compression frame, on the anode side or preferably comprises more or all the electrochemical cells in the stack having, each, a cover attached to their respective compression frame on the anode side. Anode solution or wastewater can be supplied to the enclosure(s) thus formed, in a similar way as described in relation with the embodiments illustrated in FIGS. 6 and 7.

Covers 760A and 760B which are used for isolating the cathodes of the electrochemical cell in the embodiment illustrated in FIG. 8 have a different construction than the cover 460 illustrated in FIG. 5. Such a cover is illustrated as cover 760 in FIG. 9. Cover 760 has a body 766 with only one open side 761 provided with an opening 767, which, in the assembled stack of the embodiment illustrated in FIG. 8, is placed next to the compression frame facing the cathode side of an electrochemical cell. Open side 761 is provided with a seal 763 which prevents the leaking of the wastewater from the reactor tank into the enclosure 790 formed by the cover and the compression frame of the electrochemical cell, placed on the cathode side and prevents the leaking of the cathode solution from the enclosure 790 into the reactor tank. Side 762, opposite to side 761, is a continuous panel, without any opening, and prevents any wastewater from the reactor tank from reaching the enclosure 790. The cover is provided with an inlet pipe 764 through which a cathode solution can be flown into the enclosure, and an outlet pipe 765 through which the products of the reactions taking place at the cathode can be flown out of the enclosure. A venting pipe 776 is provided to allow the venting of gases from the enclosure 790 through the venting orifice 775 to the atmosphere or to a gas containment tank.

A wastewater treatment system can comprise more than one module 300 illustrated in FIG. 3. The polluted wastewater is stored in a holding tank from where it is pumped to the reactor tanks of modules 300 where it is treated for removing the pollutants. In some embodiments, the reactor tank can include a recirculation pump or a stirring mechanism or can use the product gases to help mix the wastewater within the tank. If the system comprises more than one module 300, the stacks in modules 300 can be connected in series or in parallel, as illustrated for example in applicant's co-owned U.S. patent application Ser. No. 14/648,414.

In the embodiments presented here each electrochemical cell can comprise a catalyst coated membrane (CCM) as illustrated in FIG. 1. In alternative embodiments, the anode and the cathode catalysts can be deposited for example on the sides of the open pore meshes which face the membrane when the electrochemical cell is assembled together. Furthermore, in other embodiments, the anode catalyst can be deposited on one side of the membrane and the cathode catalyst can be deposited on the side of the open pore mesh that is facing the other side of the membrane when the electrochemical cell is assembled together or the cathode catalyst can be deposited on one side of the membrane and the anode catalyst can be deposited on the side of the open pore mesh that is facing the other side of the membrane when the electrochemical cell is assembled together. In all the embodiments, there is a reduced gap between the electrodes (the catalyst layers placed next to or deposited on the anode and respectively the cathode side of the membrane) which is secured by the system's uniform compression system.

In all the embodiments of the present invention, by "electrode" it is understood a catalyst layer since the electrode does not comprise a gas diffusion layer such that the anode is in fact the anode catalyst layer and the cathode is the cathode catalyst layer. The anode and the cathode catalysts can comprise a variety of catalyst materials including but not limited to platinum, platinum-derived alloys comprising iridium, ruthenium, rhodium, palladium, cobalt, nickel, iron and iron alloys, copper and copper alloys, mixed metal oxides, diamond, and ceramic-derived catalysts. As known in the art, use of supported catalysts can improve the dispersion of the catalytic materials and thus utilization and also the interaction between certain catalysts and supports can enhance catalytic activity and durability. Examples of catalyst supports that could be used in combination with the list of catalyst materials in the present invention comprise titanium, niobium, nickel, iron, graphite, mixed metal oxides, and ceramics. Anode and cathode catalysts can also comprise stainless steel or graphite.

The covers described in the present invention are made of a non-conductive material, such as for example polytetrafluoroethylene (PTFE) or PVDF, or other such plastic materials.

The advantages of the present electrochemical cell for wastewater treatment and the method of operating it are numerous compared to the solutions from the prior art. These advantages include (1) isolation of the cathode electrode from the wastewater being treated to prevent fouling and poisoning of the cathode during operation, (2) combination with anion type of SPE materials allowing the use of a closed loop high concentration brine on the cathode in order to produce on-demand hypochlorous acid on the anode, and (3) Isolation of the anode in order to allow the cathode to perform the wastewater pre-treatment by reduction such as for example the urea reduction to ammonia with the product ammonia then being flown through the anode enclosure for oxidation.

The disclosure of U.S. provisional patent application Ser. No. 62/465,448, filed Mar. 1, 2017, is incorporated herein in its entirety.

While particular elements, embodiments and applications of the present invention have been shown and described, it will be understood, of course, that the invention is not limited thereto since modifications may be made by those skilled in the art without departing from the spirit and scope of the present disclosure, particularly in light of the foregoing teachings. Such modifications are to be considered within the purview and scope of the claims appended hereto.

The invention claimed is:

1. A stack of electrochemical cells for wastewater treatment comprising at least one electrochemical cell, the electrochemical cell comprising:
   a. a solid polymer electrolyte membrane;
   b. an anode catalyst layer adjacent to a first side of the solid polymer electrolyte membrane and a cathode catalyst layer adjacent to a second side of the solid polymer electrolyte membrane, opposite to the first side;
   c. a first open pore mesh adjacent to the anode catalyst layer and a second open pore mesh adjacent to the cathode catalyst layer;
   d. a first compression frame, adjacent to the first open pore mesh and a second compression frame, adjacent to the second open pore mesh, each of the compression frames having compression arms spread within the area delimited by the perimeter of the frame, the compression arms being connected to each other at connection sites;
   e. fasteners which protrude through holes provided in the compression arms of the first and second compression frames at the connection sites, through holes provided in the first and second open pore meshes and through the solid polymer electrolyte membrane and the anode and cathode catalyst layers,
   wherein a cover is attached to the first compression frame or to the second compression frame to form an enclosure for isolating the anode or the cathode catalyst layer.

2. The stack of claim 1 wherein the cover has an inlet pipe for feeding wastewater, a cathode solution or an anode solution into the enclosure formed by the cover, one side provided with an opening for allowing access of the wastewater, anode solution or cathode solution to the anode or cathode catalyst layer of the electrochemical cell in the stack, an outlet pipe for removing reaction products that are formed at the anode catalyst or at the cathode catalyst from the enclosure formed by the cover and a vent pipe for removing gases from the enclosure formed by the cover.

3. The stack of claim 2 further comprising a seal between the side of the cover provided with the opening and the compression frame next to that side.

4. The stack of claim 1 wherein the cover is made of a non-conductive material.

5. The stack of claim 1 comprising a plurality of electrochemical cells connected through a rod which holds one electrochemical cell in the stack at a distance from a neighbouring electrochemical cell.

6. A system for the treatment of wastewater comprising at least one stack of electrochemical cells of claim 1, the stacks being immersed in a reactor tank which contains wastewater or a cathode solution.

7. The system of claim 6 wherein the stacks are connected in series or parallel.

8. A method for wastewater treatment comprising the steps of:
   a. providing at least one electrochemical cell of claim 1 which is immersed in a reactor tank which contains the wastewater to be treated, b. supplying an anode solution to the enclosure formed by the cover which is attached to the first compression frame on the anode side,
c. providing a voltage across the electrochemical cell, and
d. operating the electrochemical cell at a current density to thereby degrade the pollutant in the wastewater.

9. A method for wastewater treatment comprising the steps of:
a. providing at least one electrochemical cell of claim 1 which is immersed in a reactor tank which contains a cathode solution,
b. supplying wastewater to be treated to the enclosure formed by the cover which is attached to the first compression frame on the anode side,
c. providing a voltage across the electrochemical cell, and
d. operating the electrochemical cell at a current density to thereby degrade the pollutant in the wastewater.

10. A method for wastewater treatment comprising the steps of:
a. providing at least one electrochemical cell of claim 1 which is immersed in a reactor tank which contains the wastewater to be treated,
b. supplying a cathode solution to the enclosure formed by the cover which is attached to the second compression frame on the cathode side,
c. providing a voltage across the electrochemical cell, and
d. operating the electrochemical cell at a current density to thereby degrade the pollutant in the wastewater.

11. A stack of electrochemical cells for wastewater treatment comprising at least a repeating unit comprising two electrochemical cells, each electrochemical cell comprising:
a. a solid polymer electrolyte membrane;
b. an anode catalyst layer adjacent to a first side of the solid polymer electrolyte membrane and a cathode catalyst layer adjacent to a second side of the solid polymer electrolyte membrane, opposite to the first side;
c. a first open pore mesh adjacent to the anode catalyst layer and a second open pore mesh adjacent to the cathode catalyst layer;
d. a first compression frame, adjacent to the first open pore mesh and a second compression frame, adjacent to the second open pore mesh, each of the compression frames having compression arms spread within the area delimited by the perimeter of the frame, the compression arms being connected to each other at connection sites;
e. fasteners which protrude through holes provided in the compression arms of the first and second compression frames at the connection sites, through holes provided in the first and second open pore meshes and through the solid polymer electrolyte membrane and the anode and cathode catalyst layers,
wherein the stack further comprises:
at least one rod for connecting the electrochemical cells in the stack and holding a first electrochemical cell in the repeating unit at a distance from a second electrochemical cell in the repeating unit, such that the anode side of the first electrochemical cell is facing the anode side of the second electrochemical cell or such that the cathode side of the first electrochemical cell is facing the cathode side of the second electrochemical cell; and
a cover placed between the compression frames of the two electrochemical cells of the repeating unit, which forms an enclosure spanning the distance between the two electrochemical cells of the repeating unit to thereby isolate the anode catalyst layers or the cathode catalyst layers of the two electrochemical cells of the repeating unit from the solution in the reactor tank.

12. The stack of claim 11 wherein the cover has an inlet pipe for feeding an anode solution, wastewater or a cathode solution into the enclosure formed by the cover, an outlet pipe for removing reaction products that are formed at the anode catalyst or at the cathode catalyst from the enclosure formed by the cover, a vent pipe for removing gases from the enclosure formed by the cover, a first side and a second side, opposite to each other, each side being provided with an opening to allow access of the anode solution or wastewater or of the cathode solution to the anode catalyst layer or respectively to the cathode catalyst layer of each of the two electrochemical cells of the repeating unit.

13. The stack of claim 12 further comprising a seal between each side of the cover and the compression frame next to that side.

14. The stack of claim 11 wherein the solid polymer electrolyte membrane is an anion solid polymer electrolyte.

15. The stack of claim 11 wherein the solid polymer electrolyte membrane is a cation solid polymer electrolyte.

16. The stack of claim 11 wherein the cover is made of a non-conductive material.

17. A system for the treatment of wastewater comprising at least one stack of electrochemical cells of claim 11, the stacks being immersed in a reactor tank which contains wastewater or a cathode solution.

18. The system of claim 17 wherein the stacks are connected in series or parallel.

19. A method for wastewater treatment comprising the steps of:
a. providing at least one repeating unit of claim 11 which is immersed in a reactor tank which contains the wastewater to be treated,
b. supplying a cathode solution to be treated to the enclosure formed by the cover which is attached to the second compression frame of the first electrochemical cell of the repeating unit and the second compression frame of the second electrochemical cell of the repeating unit,
c. providing a voltage across the first and the second electrochemical cells, and
d. operating the electrochemical cells at a current density to thereby degrade the pollutant in the wastewater.

20. A method for wastewater treatment comprising the steps of:
a. providing at least one repeating unit of claim 11 which is immersed in a reactor tank which contains the wastewater to be treated,
b. supplying an anode solution to the enclosure formed by the cover which is attached to the first compression frame of the first electrochemical cell of the repeating unit and the first compression frame of the second electrochemical cell of the repeating unit,
c. providing a voltage across the electrochemical cell, and
d. operating the electrochemical cell at a current density to thereby degrade the pollutant in the wastewater.

21. A method for wastewater treatment comprising the steps of:
a. providing at least one repeating unit of claim 11 which is immersed in a reactor tank which contains a cathode solution,
b. supplying wastewater to the enclosure formed by the cover which is attached between the first compression frame of the first electrochemical cell of the repeating unit and the first compression frame of the second electrochemical cell of the repeating unit, c. providing a voltage across the electrochemical cell, and d. operating the electrochemical cell at a current density to thereby degrade the pollutant in the wastewater.

* * * * *